No. 620,356. Patented Feb. 28, 1899.
W. A. PRATT.
DEVICE FOR TURNING RUBBER TUBES.
(Application filed Mar. 25, 1897.)
(No Model.)

WITNESSES
Harry L. Amer
Ann Poynton

INVENTOR
William A. Pratt.
By John Heddleston
Attorney

UNITED STATES PATENT OFFICE.

WILLIAM A. PRATT, OF STAMFORD, CONNECTICUT.

DEVICE FOR TURNING RUBBER TUBES.

SPECIFICATION forming part of Letters Patent No. 620,356, dated February 28, 1899.

Application filed March 25, 1897. Serial No. 629,120. (No model.)

*To all whom it may concern:*

Be it known that I, WILLIAM A. PRATT, of Stamford, in the county of Fairfield and State of Connecticut, have invented certain new and useful Improvements in Devices for Turning Rubber Tubes for Nursing-Fixtures; and I do hereby declare the following to be a full, clear, and exact description of the invention, such as will enable others skilled in the art to which it appertains to make and use the same.

This invention relates to the method and apparatus for turning rubber tubes; and the object of the same is to provide a simple method and device whereby rubber tubes used in connection with nursing-fixtures may be turned so that the inner surface thereof may be thoroughly cleansed.

The invention consists in the novel features of the construction hereinafter fully described and claimed, and illustrated by the accompanying drawings, in which—

Figure 1:
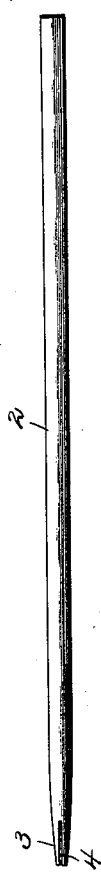
Figure 2:
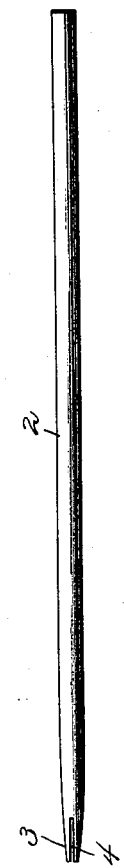
Figure 3:

Figure 1 is a view illustrating the tubes constituting the apparatus used in my invention. Fig. 2 illustrates the parts in position for turning the tube. Fig. 3 illustrates the tube partly turned.

Referring to the accompanying drawings, 1 indicates a short metallic tube which is open at both ends and tapering on its inner surface adjacent one end.

2 is a rod somewhat longer than the tube 1, said rod being tapered at one end at 3 and provided with a slot 4.

In practicing my method for turning tubes the short metallic tube 1 is placed within the rubber tube which is to be turned until the latter projects a short distance beyond the outer edge thereof. The rod 2 is then used to press the rubber tube over the edge of the metal tube, the tapered end of the rod being inserted within the large end of the metal tube and the rubber tube held between the rod and metal tube. The rod is then pressed within the metal tube as far as possible until it engages the inner tapered surface thereof, and is then turned with the right hand, the left hand holding the tube until it binds securely. The thumb and forefinger of the right hand are then placed just above the point of fastening, and the rubber tube is pushed toward the operator, the same beginning to turn, and by following up this operation with the fingers the tube will be entirely turned. After the rubber tube is turned the device is disconnected by removing the rod from the metal tube.

From the foregoing description it will be seen that I have produced a method and apparatus for turning rubber tubes whereby the same are quickly and readily turned for the purpose of thoroughly cleansing and removing the dirt which adheres to the inner surface thereof.

Having thus fully described my invention, what I claim, and desire to secure by Letters Patent, is—

In an apparatus for turning tubes, the combination with a short tube interiorly tapered adjacent one end and adapted to be placed within the rubber tube to be turned with the end of the latter projecting beyond the end of the former, of a rod tapered at one end and provided with a transverse slot in its tapered end, said rod being adapted to be inserted within said tube and to engage the end of the rubber tube to cause the same to impinge between the inner tapered surface of the tube and the rod, substantially as set forth.

In testimony whereof I have signed this specification in the presence of two subscribing witnesses.

WILLIAM A. PRATT.

Witnesses:
J. HOWARD BALLARD,
FRANK R. ALLEN.